US010562439B2

(12) United States Patent
Atsmon (10) Patent No.: US 10,562,439 B2
(45) Date of Patent: Feb. 18, 2020

(54) TECHNIQUES FOR OPTIMIZING VEHICLE HEADLIGHTS BASED ON SITUATIONAL AWARENESS

(71) Applicant: Harman International Industries, Inc., Stamford, CT (US)

(72) Inventor: Alon Atsmon, Greenwich, CT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/000,188

(22) Filed: Jan. 19, 2016

(65) Prior Publication Data
US 2017/0203682 A1 Jul. 20, 2017

(51) Int. Cl.
*B60Q 1/08* (2006.01)
*H04N 5/33* (2006.01)
(Continued)

(52) U.S. Cl.
CPC ............ *B60Q 1/085* (2013.01); *G01S 13/867* (2013.01); *G01S 13/931* (2013.01); *G01S 17/023* (2013.01);
(Continued)

(58) Field of Classification Search
CPC ................ B60Q 1/085; B60Q 2300/45; G06K 9/00805; H04N 5/332; G01S 13/867; G01S 13/931; G01S 17/936; G01S 17/023
See application file for complete search history.

(56) References Cited

U.S. PATENT DOCUMENTS

2004/0051659 A1* 3/2004 Garrison ............... G01S 13/931
342/70
2011/0245992 A1 10/2011 Stahlin et al.
(Continued)

FOREIGN PATENT DOCUMENTS

CN 103660837 A 10/2013
DE 102008058386 A1 5/2010
(Continued)

OTHER PUBLICATIONS

Watanabe, Toyota, JP2008120162, machine translation, dated May 2008.*
(Continued)

Primary Examiner — Tracie Y Green
(74) Attorney, Agent, or Firm — Artegis Law Group, LLP (57) ABSTRACT

In one embodiment, a headlight control subsystem optimizes headlamps associated with a vehicle. In operation, the headlight control subsystem receives image data and performs image detection operations that identify one or more objects included in the image. The headlight control subsystem then performs lighting calculations that determine characteristics of vehicle headlights that optimally illuminates the identified objects. Subsequently, the headlight control subsystem configures the headlamps to emit the vehicle headlights, thereby illuminating the object. Notably, in low light conditions, because the headlight control system expands the effective view of the driver through the windshield, the headlight control system increases the ability of the driver to comprehend environmental hazards and perform corrective action. By contrast, supplemental low light viewing techniques that rely on secondary screens or projected data may distract and/or confuse the driver and, consequently, may not reduce the likelihood of accidents attributable to low light conditions.

19 Claims, 5 Drawing Sheets

(51) Int. Cl.
*G01S 17/93* (2006.01)
*G01S 13/00* (2006.01)
*G01S 13/86* (2006.01)
*G01S 13/931* (2020.01)
*G01S 17/02* (2020.01)
*G06K 9/00* (2006.01)

(52) U.S. Cl.
CPC ........ *G01S 17/936* (2013.01); *G06K 9/00805* (2013.01); *H04N 5/332* (2013.01); *B60Q 2300/45* (2013.01)

(56) References Cited

U.S. PATENT DOCUMENTS

| | | | |
|---|---|---|---|
| 2012/0226411 A1 | 9/2012 | Kuoch et al. | |
| 2012/0257060 A1* | 10/2012 | Bos | B60N 2/002 348/148 |
| 2013/0027557 A1* | 1/2013 | Hirai | B60S 1/0844 348/148 |
| 2013/0058116 A1 | 3/2013 | Galbas et al. | |
| 2013/0128044 A1* | 5/2013 | Zhang | G06T 7/00 348/148 |
| 2015/0246633 A1* | 9/2015 | Futamura | B60Q 1/143 362/466 |
| 2016/0131579 A1* | 5/2016 | Sekiguchi | G01N 21/55 701/36 |

FOREIGN PATENT DOCUMENTS

| | | |
|---|---|---|
| DE | 102009020910 A1 | 11/2010 |
| DE | 102012016782 A1 | 2/2014 |
| EP | 2295292 A1 | 3/2011 |
| JP | 2008120162 A | 5/2008 |
| JP | 2008143505 A | 6/2008 |
| JP | 2011157023 A | 8/2011 |
| WO | 2008132130 A1 | 11/2008 |

OTHER PUBLICATIONS

Wegwerth et al, EP2077536 A2 , mahine translation, dated Feb. 2014.*
"Head Lamp Control", 2 pages, website: http://www.mobileye.com/technology/applications/head-lamp-control/, website dated Dec. 30, 2015.
Extended European Search Report for Application No. EP 17150746.0 dated Jun. 23, 2017, 10 pages.

* cited by examiner

TECHNIQUES FOR OPTIMIZING VEHICLE HEADLIGHTS BASED ON SITUATIONAL AWARENESS

BACKGROUND

Field of the Various Embodiments

The various embodiments relate generally to automotive systems and, more specifically, to techniques for optimizing vehicle headlights based on situational awareness.

Description of the Related Art

In general, low light conditions impair the ability of drivers to perceive the environment surrounding their vehicles. In particular, at night, the useful visual data that drivers receive via the windshields of vehicles is largely limited to illuminated objects. Such restricted "windshield views" dramatically increases the likelihood of collisions and accidents. To increase safety, vehicles are equipped with headlamps that produce "headlights"—beams of light that illuminate some of the environment in front of, and in the related front periphery of, vehicles, which effectively increases the windshield view. However, the ability of headlamps to illuminate those parts of the environment is limited. Consequently, drivers are oftentimes oblivious to objects that lie outside the area illuminated by the vehicles' headlamps. Accordingly, in an effort to reduce the likelihood of collisions and accidents attributable to undetected objects, many vehicles are equipped with additional features designed to mitigate the negative impact of low light conditions on driver perception and awareness.

In one approach, vehicles are equipped with infrared cameras. In operation, images from the infrared cameras are displayed via infotainment screens mounted inside the vehicles. While driving, a driver can glance from the windshield to the infotainment screen to supplement the visual data the driver receives via the windshield view. However, the windshield view and the infotainment screen are typically disconnected and glancing back-and-forth between the two takes the driver's eyes off the road and also may disorient the driver. Further, at night, glancing at the lighted infotainment screen may reduce the night vision of the driver, thereby decreasing the ability of the driver to detect objects that are partially illuminated in the windshield view.

In another approach, sensor data is projected onto windshields or delivered to the driver via a heads-up displays. Such sensor data may include navigation data, infrared camera data, etc. While projecting sensor data can increase the amount of environmental data that a driver receives without requiring the driver to disengage from the windshield view, the context of the sensor data is usually inconsistent with the windshield view. In particular, the images projected onto the windshield are typically two-dimensional, while the real-life images included in the windshield view are three-dimensional. Consequently, although the driver may see objects included in a projected image, the driver may not be able to deduce where such objects are located within the three-dimensional space surrounding the vehicle. Such confusion can prevent the driver from being able to effectively maneuver around obstacles that appear in the projected image but are located outside the windshield view.

In general, supplemental viewing techniques such as those described above, tend to increase the amount of data drivers receive without necessarily increasing the ability of drivers to comprehend critical environmental data. As a result, these types of supplemental viewing techniques may not effectively increase driver safety during low light conditions.

As the foregoing illustrates, more effective techniques for mitigating the impact of low light conditions on driver safety would be useful.

SUMMARY

One embodiment sets forth a method for controlling a vehicle light source. The method includes detecting a first object within a vicinity of a vehicle that includes the vehicle light source; generating one or more characteristics for a light beam that is to be generated by the vehicle light source based on the first object; and configuring the vehicle light source to generate the light beam based on the one or more characteristics.

Further embodiments provide, among other things, a computer-readable medium and a system configured to implement the method set forth above.

At least one advantage of the disclosed techniques is that vehicles may be equipped with a headlight control system that implements these techniques to improve driver safety in low-light conditions. Notably, configuring the headlight control system to detect and illuminate objects relevant to the vehicle optimizes the view of the driver through the windshield. As a result, the ability of the driver to detect hazards in the vicinity of the vehicle and respond appropriately is increased. By contrast, conventional supplemental viewing techniques, such as display screens, may increase the amount of data the driver receives without necessarily increasing the ability of the driver to comprehend the data.

BRIEF DESCRIPTION OF THE DRAWINGS

So that the manner in which the above recited features of the various embodiments can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting in scope, for the various embodiments may admit to other equally effective embodiments.

DETAILED DESCRIPTION

In the following description, numerous specific details are set forth to provide a more thorough understanding of the various embodiments. However, it will be apparent to one of skill in the art that the various embodiments may be practiced without one or more of these specific details.

Vehicle Overview

Figure 1:
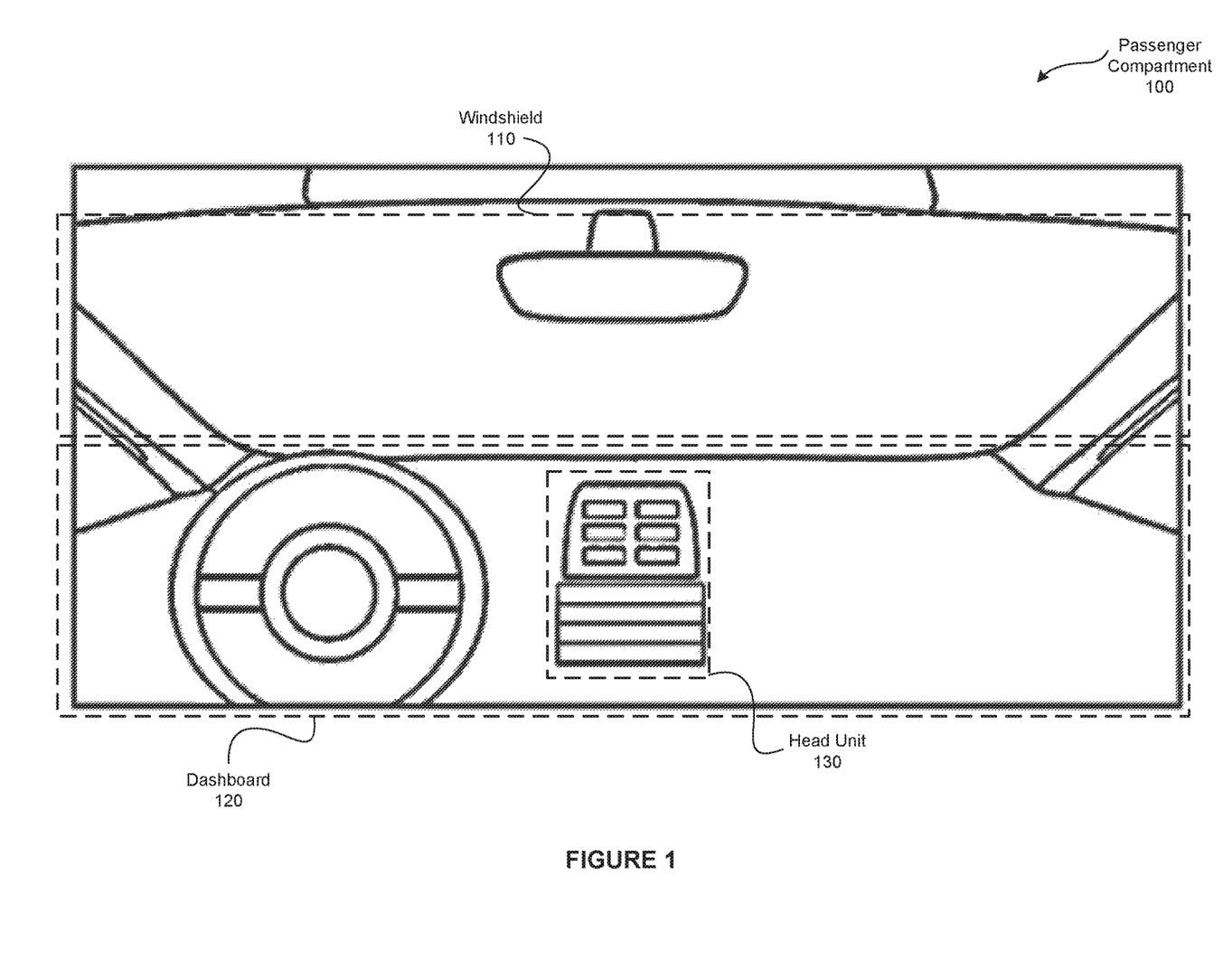
FIG. 1 illustrates a passenger compartment of a vehicle that is configured to implement one or more aspects of the various embodiments.

FIG. 1 illustrates a passenger compartment 100 of a vehicle that is configured to implement one or more aspects of the various embodiments. As shown, the passenger compartment 100 includes, without limitation, a windshield 110 and a head unit 130 positioned proximate to a dashboard 120. In various embodiments, the passenger compartment 100 may include any number of additional components that implement any technically feasible functionality. For example and without limitation, in some embodiments the passenger compartment 100 may include a rear-view camera.

The windshield 110 is the front window of the vehicle and is typically fabricated of safety glass or high-impact acrylic plastic. As referred to herein, the "windshield view" is the useful visual data that drivers receive via the windshield of vehicles. In general, if an object lies outside the line-of-sight of a driver, then the object is not included in the windshield view. Further, in low light conditions, the windshield view includes objects that are visible to the driver, such as objects that are relatively well illuminated, and does not include objects that the driver is unable to detect because they are relatively poorly illuminated.

As shown, the head unit 130 is located in the center of the dashboard 120. In various embodiments, the head unit 130 may be mounted at any location within the passenger compartment 100 in any technically feasible fashion that does not block the windshield 110. The head unit 130 may include any number and type of instrumentation and applications, and may provide any number of input and output mechanisms. For example, and without limitation, the head unit 130 typically enables the driver and/or passengers to control entertainment functionality. In some embodiments, the head unit 130 may include navigation functionality and/or advanced driver assistance functionality designed to increase driver safety, automate driving tasks, and the like.

The head unit 130 may support any number of input and output data types and formats as known in the art. For example, and without limitation, in some embodiments, the head unit 130 may include built-in Bluetooth for hands-free calling and audio streaming, universal serial bus (USB) connections, speech recognition, rear-view camera inputs, video outputs for any number and type of displays, and any number of audio outputs. In general, any number of sensors, displays, receivers, transmitters, etc. may be integrated into the head unit 130 or may be implemented externally to the head unit 130. External devices may communicate with the head unit 130 in any technically feasible fashion.

Figure 2:
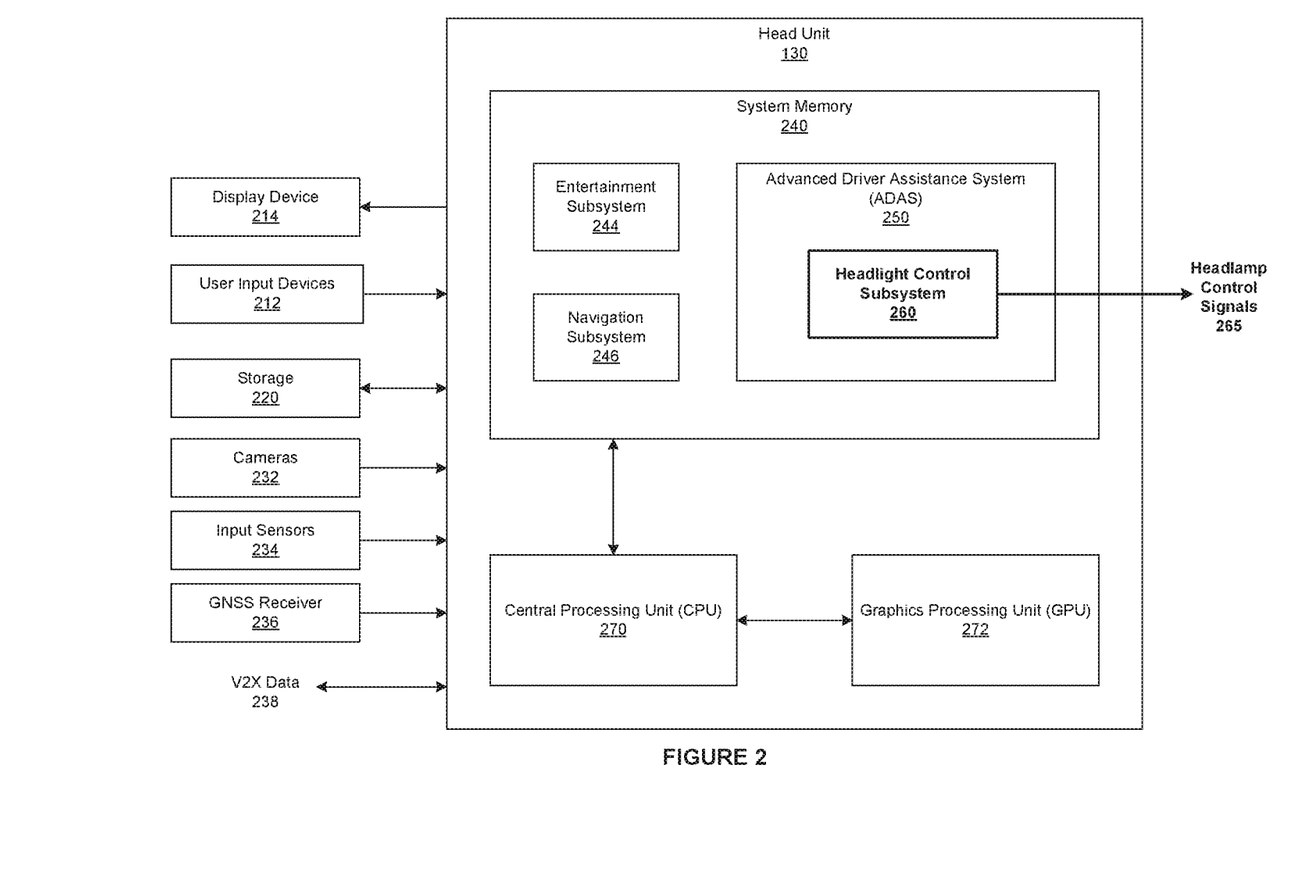
FIG. 2 is a more detailed illustration of the head unit of FIG. 1, according to various embodiments.

FIG. 2 is a more detailed illustration of the head unit 130 of FIG. 1, according to various embodiments. As shown, the head unit 130 includes, without limitation, a central processing unit (CPU) 270, a graphics processing unit (GPU) 272, and a system memory 240. The CPU 270, the GPU 272, and the system memory 240 may be implemented in any technically feasible fashion. For example, and without limitation, in various embodiments, any combination of the CPU 270, the GPU 272, and the system memory 240 may be implemented as a stand-alone chip or as part of a more comprehensive solution that is implemented as an application-specific integrated circuit (ASIC) or a system-on-a-chip (SoC).

The CPU 270 generally comprises a programmable processor that executes program instructions to manipulate input data. The CPU 270 may include any number of processing cores, memories, and other modules for facilitating program execution. The CPU 270 may receive input from drivers and/or passengers of the vehicle via any number of user input devices 212. The user input devices 212 may include various types of input devices, such as buttons, a microphone, cameras, a touch-based input device integrated with a display device 214 (i.e., a touch screen), and other input devices for providing input data to the head unit 130. The GPU 172 generally comprises a programmable or fixed function processor that accepts commands and data from the CPU 170 and generates pixels for display on the display device 214.

The system memory 274 generally comprises storage chips such as random access memory (RAM) chips that store application programs and data for processing by the CPU 170 and/or the GPU 172. In various embodiments, the system memory 274 includes non-volatile memory such as optical drives, magnetic drives, flash drives, or other storage. In some embodiments, a storage 260 may supplement or replace the system memory 274. The storage 270 may include any number and type of external memories that are accessible to the CPU 170. For example, and without limitation, the storage 270 may include a Secure Digital Card, an external Flash memory, a portable compact disc read-only memory (CD-ROM), an optical storage device, a magnetic storage device, or any suitable combination of the foregoing.

As shown, the system memory 240 includes, without limitation, an entertainment subsystem 244, a navigation subsystem 246, and an advanced driver assistance system (ADAS) 250. The entertainment subsystem 244 includes software that controls any number and type of entertainment components, such as an AM/FM radio, a satellite radio, a Moving Picture Experts Group Layer-3 (MP3) player, a compact disc (CD) player, and so forth. In some embodiments, any number of entertainment components may be included in the head unit 130 and any number of entertainment components may be implemented as stand-alone devices. The navigation subsystem 246 includes any number and type of applications that enable a driver to efficiently navigate the vehicle. For example, the navigation subsystem 246 may include maps, direction routing software, and the like.

The ADAS 250 subsystem includes functionality that is designed to increase driver safety and/or automate driving tasks. For example, and without limitation, in various embodiments, the ADAS 250 subsystem may provide hill descent control, automatic parking, and the like. Notably, the functionality included in the ADAS 250 may supplement, enhance, and/or automate functionality provided by other components included in the vehicle to decrease the likelihood of accidents or collisions in challenging conditions and/or driving scenarios.

In particular, during low-light conditions, the windshield view is restricted to objects that are illuminated. Because, such a restricted windshield view impairs the ability of a driver of a vehicle to perceive the environment in front of, and in the related front periphery of, the vehicle, the likelihood of collisions and accidents during low light conditions is increased. Consequently, to increase safety, vehicles are equipped with headlamps that produce headlights. For explanatory purposes, as referred to herein, a headlamp is a light source designed to provide external illumination for a vehicle. In a complementary fashion, as referred to herein, a "headlight" is any beam of light, also referred to herein as light beam, that is produced and distributed by a headlamp. For example, and without limitation, a vehicle may include any number and type of headlamps, such as low beam headlamps, high beam headlamps, fog headlamps, variable illumination headlamps, and so forth. Further, each headlamp may be implemented in any technically feasible fashion. For example, and without limitation, in some embodiments a headlamp may be a round sealed-beam headlamp with internal halogen burners, an aerodynamically-shaped high-energy discharge (HED) headlamp, a light array of multiple, discrete light-emitting diode (LED) light sources, and so forth.

In operation, the headlights of a vehicle, also referred to herein as vehicle headlights, illuminate some of the environment in front of, and in the related front periphery of, the vehicle, which effectively increases the windshield view. However, the ability of headlamps to illuminate those parts of the environment is limited. As a result, drivers are oftentimes oblivious to objects that lie outside the area illuminated by the vehicles' headlamps. In conventionally equipped vehicles, the orientations of the headlamps are fixed during operation. More specifically, the headlamps are typically oriented to emit vehicle headlights that illuminate the area directly in front of the vehicle. However, while such a lighting arrangement may illuminate objects that are relevant to the safe operation of a vehicle in certain situations, in other situations objects that lie to one side of the vehicle may be more critical to the safe operation of the vehicle than the objects that lie directly in front of the vehicle.

For example, and without limitation, if a pedestrian is crossing from the left side of a road to the right side of the road a night, then the headlights of a conventionally equipped vehicle would illuminate the area directly in front of the vehicle while leaving the pedestrian unilluminated. By the time the pedestrian moved into the area illuminated by the headlights, the driver could be unable to successfully execute collision avoidance maneuvers and could hit the pedestrian. In another example, and without limitation, suppose that a boulder is careening down a mountainside at night. Further, suppose that the mountainside abuts the right lane of a highway and a driver is steering a vehicle along the highway. In such a scenario, the headlights of a conventionally equipped vehicle could illuminate the area directly in front of the vehicle while leaving the boulder unilluminated. By the time the boulder rolls into the area illuminated by the headlights, the driver could be unable to avoid the boulder, the boulder could collide with the vehicle, and the driver and any passengers could be injured.

Dynamically Controlling Vehicle Headlights

As the foregoing examples illustrate, to decrease the likelihood of accidents and collisions during low light conditions, a more situationally aware approach to controlling the vehicle headlights would be helpful. Accordingly, the ADAS 250 includes a headlight control subsystem 260 that is configured to detect objects that are relevant to driving the vehicle and then dynamically orient the headlamps to optimally illuminate the relevant objects. For example, and without limitation, if a pedestrian is on the left side of the road, then the headlight control subsystem 260 detects the pedestrian and, in response, angles the headlamps to the left such that the headlamps emit vehicle headlights that illuminate the pedestrian. Similarly, if a boulder is careening down a mountainside to the right of the vehicle, then the headlight control subsystem 260 detects the boulder and, in response, angles the headlamps to the right such that the headlamps emit vehicle headlights that illuminate the boulder.

The headlight control subsystem 260 may process any type of input data and implement any technically feasible algorithm to detect objects and/or determine the relevance of objects to the vehicle. As shown, and without limitation, the headlight control subsystem 260 receives data from any number of cameras 232 and any number of input sensors 234. Each of the cameras 232 is a device capable of capturing image and/or video data. For example, and without limitation, the cameras 232 may include a front-mounted visible light video recording camera and an infrared camera. The input sensors 234 may include any type of sensors as known in the art. For example, and without limitation, the input sensors 235 may include a radio detection and ranging (RADAR) sensor, a light detection and ranging (LIDAR) sensor, a dedicated short range communication (DSRC) sensor, and the like.

In some embodiments, the headlight control subsystem 260 may receive additional input data, referred to herein as advanced driver assistance system (ADAS) data. Such ADAS data may include, without limitation, data received from a global navigation satellite system (GNSS) receiver 236 and data received from the navigation subsystem 245. The global navigation satellite system (GNSS) receiver 236 determines global position of the vehicle. The GNSS receiver 236 operates based on one or more of the global positioning system of manmade Earth satellites, various electromagnetic spectrum signals (such as cellular tower signals, wireless internet signals, and the like), or other signals or measurements, and/or on a combination of the above items. In various embodiments, the headlight control subsystem 260 accesses global positioning data from GNSS receiver 236 in order to determine a current location of the vehicle. Further, in some embodiments, the headlight control subsystem 260 accesses data provided by the navigation subsystem 246 in order to determine a likely future location of the vehicle.

In yet other embodiments, the headlight control subsystem 260 may receive and transmit additional ADAS data including, and without limitation, automotive vehicle-to-everything (V2X) data 238. The vehicle-to-everything (V2X) data 238 may include vehicle-to-vehicle (V2V) data, vehicle-to-infrastructure (V2I) data, and so forth. The V2X data 238 enables the vehicle to communicate with other objects that include V2X capabilities. For example, the vehicle may communicate with other vehicles, smartphones, traffic lights, laptops, road-side V2X units, and so forth.

After receiving and processing the input data, the headlight control subsystem 260 generates any number of headlamp control signals 265 that configure any number of headlamps in any technically feasible fashion. The headlight control signals 265 may be transmitted in any format and any technically feasible fashion that is consistent with the capabilities of the headlamps. For example, the headlight control signals 265 may be electrical signals that are transmitted to the headlamps via electrical wires connecting the head unit 130 to the headlamps. Based on the headlight control signals 265, the headlamps are configured to vary the nature of the vehicle headlights in any technically feasible fashion.

For example and without limitation, in some embodiments the headlamps may be mounted on a pan-tilt assembly that enables the headlight control subsystem 260 to adjust the vertical and horizontal angles of the vehicle headlights relative to the front of the vehicle. In some embodiments, the headlamps may include variable focusing systems that enable the headlight control subsystem 260 to tailor the illumination, convergence, divergence, etc. of the vehicle headlights. The variable focusing system may be implemented in any technically feasible fashion. For example, and without limitation, the variable focusing system may include any number one or more lenses, reflectors, diffusers, filters, and the like. In some embodiments, the headlamps may include an adjustable power source that allows the headlight control subsystem 260 to modify the illumination intensity of the vehicle headlights. In yet other embodiments, the headlamps may include multicolor LEDs and the headlight control subsystem 260 may select the color of the vehicle headlights emitted by the headlamps based on any criterion, such as relative importance of different objects.

As part of identifying and illuminating objects that are pose a safety risk to the vehicle, such as a pedestrian or a boulder, the headlight control subsystem 260 may implement any number of algorithms that fine-tune the vehicle headlights to optimize visibility. For example, and without limitation, the headlight control subsystem 260 may implement algorithms to avoid washout conditions attributable to vehicle headlights. If the headlight control subsystem 260 determines that the current illumination intensity of the vehicle headlights could reduce the visibility of a particular object, then the headlight control subsystem 260 could control variable focusing capabilities and/or adjustable power sources included in the headlamps to reduce the illumination intensity. In particular, if the head unit 130 determines that the current illumination intensity of the vehicle headlights could over-illuminate a street sign such that the driver would be unable to read the street sign, then the headlight control subsystem 260 could reduce the illumination intensity.

Further, in some embodiments, the headlight control subsystem 260 may implement any number of algorithms that optimize the vehicle headlights to improve the driving experience. For example, and without limitation, in some embodiments, the headlight control subsystem 260 may be configured to illuminate street signs, addresses on curbs, mailboxes, etc., names on buildings, gates, etc., and/or other navigational beacons. More specifically, the headlight control subsystem 260 could receive positional data associated with the vehicle from the GNSS receiver 236, receive route data from the navigation subsystem 246, and receive image data from the camera 232. If the positional data and the route data indicate an upcoming left turn at street "X," then the headlight control subsystem 260 could perform image detection operations on the image data to determine whether an "X" street sign is included in the image data. If the headlight control subsystem 260 determines that the image data includes the "X" street sign, then the headlight control subsystem 260 could configure the headlamps to emit vehicle headlights that illuminate the X street sign.

In yet another example, and without limitation, the headlight control subsystem 260 could focus on illuminating business signs, billboards, etc. More specifically, the headlight control subsystem 260 could receive an advertisement from a company "Y" and, in response, the head unit 130 could perform image detection operations on image data to identify signs and buildings associated with the company Y. If the headlight control subsystem 260 detects a sign or building associated with the company Y, then the headlight control subsystem 260 could configure the headlamps to emit vehicle headlights that illuminate the sign or building.

In general, the headlight control subsystem 260 may be configured to detect, illuminate, and track any number of objects in any method that improves the driving experience in any type of conditions. Further, the headlight control subsystem 260 may implement any technically feasible algorithm to prioritize the illumination of the objects. For example, if a pedestrian is on the left side of the road and a billboard is on the right side of the road, then the headlight control subsystem 260 could be configured to illuminate the left side of the road instead of the right side of the road.

Although the headlight control subsystem 260 is described in the context of the head unit 130 herein, the functionality included in the headlight control subsystem 260 may be implemented in any technically feasible fashion and in any combination of software and hardware. For example, and without limitation, each of the CPU 270, the GPU 272, and the system memory 240 may be embedded in or mounted on a laptop, a tablet, a smartphone, or the like that implements the headlight control subsystem 260. In other embodiments, and without limitation, the headlight control subsystem 260 may be implemented as a stand-alone unit that supplements the functionality of existing vehicle headlight systems. Such a stand-alone unit may be implemented as a software application that executes on any processor included in any system that is capable of communicating and controlling any type of light source. In some embodiments, such a stand-alone unit may include software and a processor that communicate with any number of light sources that are affixed to the front of the vehicle. These light sources may replace or supplement existing headlamps. In various embodiments a software application included in the headlight control subsystem 260 may execute one or more library calls to a software library of routines that perform any number of operations. For example, and without limitation, such a software application could execute library calls that implement detection operations associated with a visible light camera.

Figure 3:
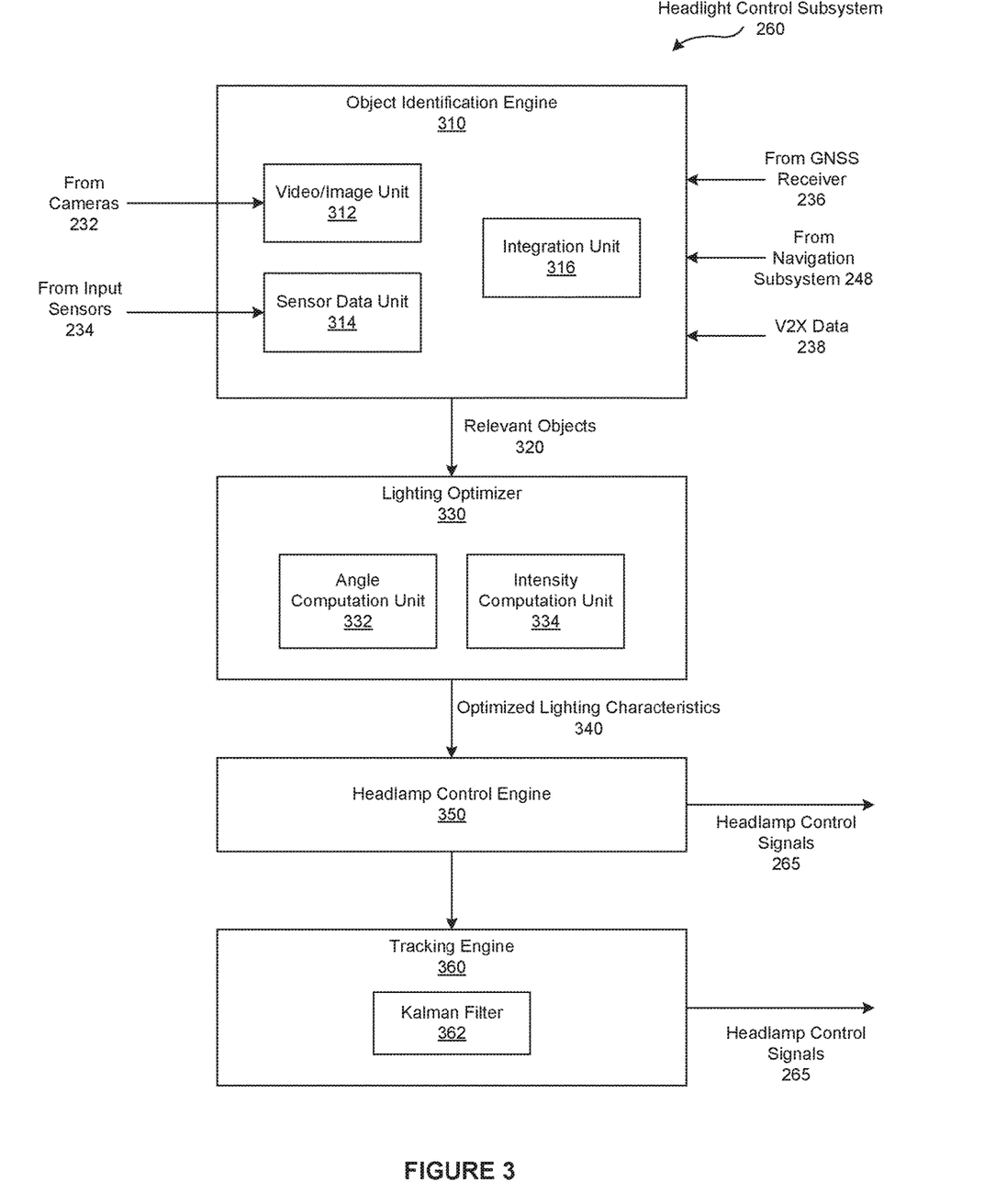
FIG. 3 is a more detailed illustration of the headlight control subsystem of FIG. 2, according to various embodiments.

FIG. 3 is a more detailed illustration of the headlight control subsystem 260 of FIG. 2, according to various embodiments. As shown, the headlight control subsystem 260 includes, without limitation, an object identification engine 310, a lighting optimizer 330, a headlamp control engine 350, and a tracking engine 360. In alternate embodiments, without limitation, any number of components may provide the functionality included in the headlight control subsystem 360 and each of the components may be implemented in software, hardware, or any combination of software and hardware.

The object identification engine 310 includes, without limitation, a video/image unit 312, a sensor data unit 314, and an integration unit 316. The video/image unit 312 receives still image data and/or frames from the cameras 232 and performs object detection operations to generate lists of objects. In general, the video/image unit 312 may process input data in a continuous manner or as discrete data sets. Further, the video/image unit 312 may process input data from different cameras 232 concurrently, sequentially, or any combination thereof. The video/image unit 312 may implement any number of technically feasible object detection algorithms and generate any number of lists of objects. For example and without limitation, in various embodiments the video/image unit 312 may process input data from different cameras 232 independently to form multiple objects lists, in an integrated fashion to form a single object list, or any combination thereof.

In particular, in some embodiments, the video/image unit 312 may receive frames of image data from a visible light video recording camera 232 and still images from an infrared camera. In such embodiments, the video/image unit 312 may perform object detection operations separately on the frames of image data and the still images to create two lists of objects. In other embodiments, the video/image unit 312 may perform any number of object detection operations of the input data independently and then one or more integration operations to merge the detected objects into a single list of detected objects.

In a similar fashion, the sensor data unit 314 receives data from the input sensors 234 and performs object detection operations to generate additional lists of objects. Notably, both the video/image unit 312 and the sensor data unit 314 may perform any type of object detection operations based on the data from, respectively, the cameras 232 and the input sensors 232 in any technically feasible fashion. For example and without limitation, in some embodiments the video/image unit 312 and the sensor data unit 314 may implement object detection algorithms that identify any objects included within a specific distance of the vehicle. In other embodiments, and without limitation, the video/image unit 312 and the sensor data unit 314 may implement object detection algorithms that search for specific types of objects, such as other vehicles, traffic lights, road signs, and the like. Further, the video/image unit 312 and the sensor data unit 314 may implement different object detection algorithms. For example, and without limitation, the video/image unit 312 may be configured to detect any objects included in the image data received from the cameras 232. By contrast, the sensor data unit 314 may be configured to detect any objects included in the data received from the input sensors 232 that lie within a line-of-sight relative to the vehicle and exclude objects that do not lie within the line-of-sight relative to the vehicle.

The integration unit 316 receives the lists of objects from the video/image unit 312 and the sensor data unit 314 in addition to ADAS input data. The ADAS input data may include any type of data that is relevant to driving the vehicle including, and without limitation, data from the GNSS receiver 236, data from the navigation subsystem 248, and V2X data 238. The integration unit 316 performs one or more fusion operations on the received data to synthesize an integrated situational awareness that includes a list of relevant objects 320. As used herein, "situation awareness" refers to a representation of the environment in front of, and in the related front periphery of, the vehicle that may or may not include additional information, such as the relative important of objects in front of, and in the related front periphery of, the vehicle to the vehicle. The integration unit 316 may be implemented in any technically feasible fashion.

For example and without limitation, in some embodiments the integration unit 316 may perform any number of merging operations on the object lists to create the list of relevant objects 320. The integration unit 136 may then apply any number of situational assessment algorithms to prune or rank the list of relevant objects 320 based on any evaluation criterion, such as likelihood of collision with the vehicle, distance from the vehicle, and so forth. Notably, as part of the situation assessment, the integration unit 136 may leverage any type of ADAS data. For example, and without limitation, the integration unit 136 may calculate evaluation criterion based on the current position of the vehicle in accordance with data received from the GNSS receiver 236, a predicted future position of the vehicle in accordance with data received from the navigation subsystem 248, and the position of other vehicles in accordance with the V2X data 238.

The lighting optimizer 330 receives the relevant objects 320 and generates optimized lighting characteristics 340 for vehicle headlights designed to illuminate the relevant objects 320 to increase driving safety and improve the driving experience. As shown, the lighting optimizer 330 includes, without limitation, an angle computation unit 332 and an intensity computation unit 334. In alternate embodiments, the lighting optimizer 330 may include any number and type of components that compute any number of lighting characteristics that indicate the nature of the optimal vehicle headlights. For example and without limitation, in some embodiments the lighting optimizer 330 may include a color computation unit that selects a color of the headlamps based on the type of object (e.g., "red" could signify cars, "green" could signify buildings, and "purple" could signify pedestrians). In other embodiments, the lighting optimizer 330 may include a focus intensity unit that controls the convergence of the headlamps, thereby enabling the lighting optimizer 330 to configure the headlamps to spotlight any number of the relevant objects 320, diffusely light an entire region, or any combination thereof.

The angle computation unit 332 computes the angles, also referred to herein as the orientation, of the vehicle headlights relative to the vehicle such that the vehicle headlights optimally illuminate the relevant objects 320. For example, for each headlamp, the angle computation unit 332 may compute an angle relative to a horizontal axis associated with the headlamp and an angle relative to a vertical axis associated with the headlamp. The intensity computation unit 334 determines, for each vehicle headlight, the illumination intensity that maximizes driving safety. For example and without limitation, if the relevant objects 320 includes an oncoming vehicle, then the intensity computation unit 334 may be configured to set the illumination intensity to a relatively low intensity to illuminate the oncoming vehicle without blinding the driver of the oncoming vehicle. By contrast, if the relevant objects 320 do not include any oncoming vehicles, then the intensity computation unit 334 may be configured to set the illumination intensity to a relatively high intensity to maximize the path of the vehicle headlights. As referred to herein, the path of the vehicle headlights includes the area in front of, and in the related front periphery of, the vehicle that is sufficiently illuminated by the vehicle headlights to allow the driver of the vehicle to visually identify objects. In general, the lighting optimizer 330 may compute any number of optimized lighting characteristics 340 for any number of vehicle headlights in order to illuminate any number of the relevant objects 230.

The headlamp control engine 350 receives the optimized lighting characteristics 340 and generates the headlamp control signals 265 that configure the headlamps. Notably, the headlamp control engine 350 in configured to generate the headlamp control signals 265 in any technically feasible fashion that is consistent with the capabilities and interfaces implemented by the headlamps. For example, and without limitation, if a particular headlamp is mounted in a pan-tilt assembly, then the headlamp control engine 350 could convert a horizontal and vertical angle associated with a vehicle headlight and included in the optimized lighting characteristics 340 to a pan and tilt. The headlamp control engine 350 could then relay the headlamp control signals 265 that include the pan and tilt to the headlamp via wires that connect the head unit 130 to the headlamps.

Subsequently, the tracking engine 360 performs tracking operations to determine continuations of the relevant objects 320 and then generates additional headlamp control signals 265 that configure the headlamps to illuminate these continuations. As referred to herein, the continuations of the relevant objects 320 are the predicted locations of the relevant objects 320 at future times. Notably, the tracking engine 360 implements tracking algorithms that incorporate the predicted motion of the vehicle and/or the relevant objects 320 to continually illuminate the relevant objects 320.

As shown, the tracking engine 360 includes, without limitation, a Kalman filter 362. In operation, the tracking engine 360 leverages the Kalman filter 362 to predict the continuations of the relevant objects 320. More specifically, the tracking engine 360 performs one or more Kalman filtering operations based on measurements associated with the relevant objects 320. Subsequently, the tracking engine 360 adjusts the optimized lighting characteristics 340 based on the continuations of the relevant objects 320 and then generates the headlamp control signals 265. In alternate implementations, the tracking engine 360 may implement any number of algorithms in any technically feasible fashion to determine the continuations of the relevant objects 320, adjust the optimized lighting characteristics 320, and generate the headlamp control signals 265.

For example and without limitation, in some embodiments the tracking engine 360 may perform tracking operations based on data from the navigation subsystem 248 to determine the continuations of the relevant objects 320. The tracking engine 360 may then configure the lighting optimizer 330 to determine "continuation" optimized lighting characteristics 340 designed to illuminate the continuations of the relevant objects 320. Finally, the tracking engine 360 may configure the headlamp control engine 350 to generate "continuation" headlamp control signals 265 based on the continuation optimized lighting characteristics 340.

In general, the headlight control subsystem 260 may configure the object identification engine 310, the lighting optimizer 330, the headlamp control engine 350, and the tracking engine 360 to execute any number of times, in any order, and on any type of data to generate the headlamp control signals 265. Further, the functionality included in the headlight control subsystem 260 may be implemented in any number and combination of components. For example and without limitation, in some embodiments the tracking engine 360 may be omitted and tracking functionality may be included in the object identification engine 310. In such embodiments, the headlight control subsystem 260 may receive a first data set that includes the data from any number and combination of the cameras 232, the input sensors 234, the GNSS receiver 236, and the navigation subsystem 248 in addition to the V2X data 238. The object identification engine 310 may generate the relevant objects 320 based on the aforementioned data. Based on the location of the vehicle, the orientation of the headlamps, and/or the locations of the relevant objects 320, the lighting optimizer 340 may calculate the optimized lighting characteristics 340 for vehicle headlights that appropriately illuminate the relevant objects 320. The headlamp control engine 350 may then convert the optimized lighting characteristics 340 to the headlamp control signals 265 that configure the headlamps to emit the vehicle headlights as characterized.

Subsequently, the headlight control subsystem 260 may receive a second data set that includes the data from any number and combination of the cameras 232, the input sensors 234, the GNSS receiver 236, the navigation subsystem 248 in addition to the V2X data 238. The object identification engine 310 may analyze the aforementioned data to determine whether the relevant objects 320 are still present. If the relevant objects 320 are still present, then the headlight control subsystem 260 could determine whether the relevant objects 320 have moved, the vehicle has moved, or any combination thereof. Based on the determined movements, the lighting optimizer 330 may calculate the optimized lighting characteristics 340 for the vehicle headlights that appropriately illuminate the new locations of the relevant objects 320. The headlamp control engine may then convert these new optimized lighting characteristics 340 to the headlamp control signals 265 that configure the headlamps to emit the vehicle headlights as characterized.

By contrast, if the relevant objects 320 are not present, then the headlight control subsystem 260 may generate a new set of relevant objects 320. If the new set of relevant objects 320 contains no objects, then the headlight control subsystem 260 may configure the headlamps via the headlamp control signals 265 to emit "default" vehicle headlights, such as vehicle headlights that are directed directly ahead of the vehicle. The headlight control subsystem 260 may continue this process of detecting the relevant objects 320 and updating the headlamp control signals 265 to illuminate the relevant objects 320 for any number of data sets at any time intervals while the vehicle is in motion.

Figure 4:
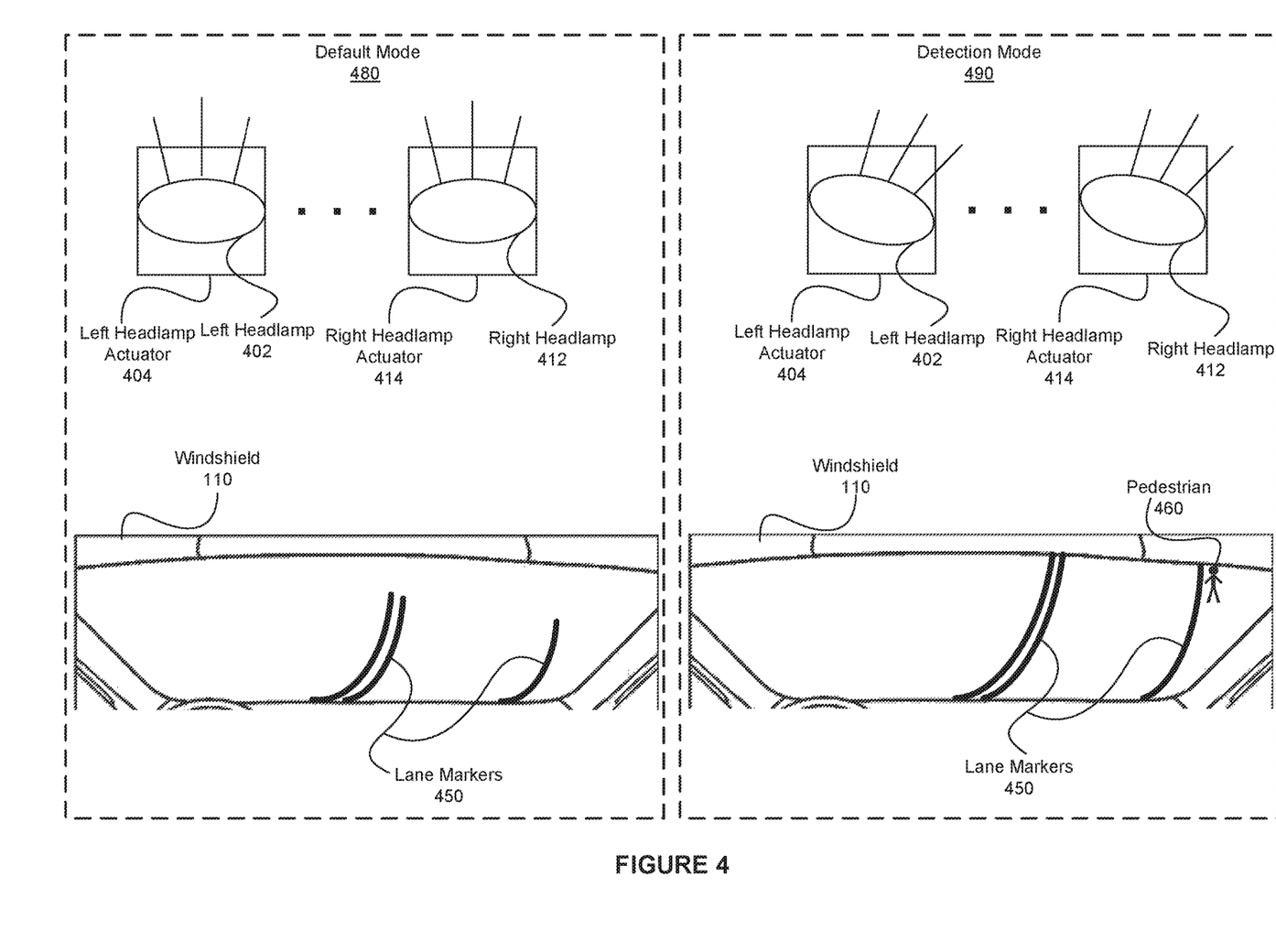
FIG. 4 is an example of how vehicle headlights are controlled by the headlight control subsystem of FIG. 3, according to various embodiments.

FIG. 4 is an example of how vehicle headlights are controlled by the headlight control subsystem 260 of FIG. 3, according to various embodiments. For explanatory purposes only, FIG. 4 depicts two different configuration of the headlight control subsystem 260: a default mode 480 and a detection mode 490. The context of both the default mode 480 and the detection mode 490 is that lane markers 450 curve from the front of the vehicle to the right of the vehicle, a pedestrian 460 is on the right side of the road and moving across the road, and low light conditions obscure any objects that are not illuminated by vehicle headlights.

In the default mode 480, the headlight control subsystem 260 is not performing any object detection or tracking operations. Instead, the headlight control subsystem 260 configures a left headlamp actuator 404 to orient a left headlamp 402 such that the left headlamp 402 emits a left vehicle headlight that illuminates the road directly in front of the vehicle. Similarly, the headlight control subsystem 260 configures a right headlamp actuator 414 to orient a right headlamp 412 such that the right headlamp 412 emits a right vehicle headlight that illuminates the road directly in front of the vehicle. Consequently, as shown, the windshield view includes a portion of the lane markers 450 but does not include the pedestrian 460. Because the driver cannot see the pedestrian 460 until the pedestrian 460 crosses directly in front of the vehicle, the driver may be unable to avoid hitting the pedestrian 460 with the vehicle.

By contrast, in the detection mode 490, the headlight control subsystem 260 is performing object detection and tracking operations. In particular, the headlight control subsystem 260 configures a left headlamp actuator 404 to orient a left headlamp 402 such that the left headlamp 402 emits a left vehicle headlight that illuminates the pedestrian 460. Similarly, the headlight control subsystem 260 configures a right headlamp actuator 414 to orient a right headlamp 412 such that the right headlamp 412 emits a right vehicle headlight that illuminates the pedestrian 460. Consequently, as shown, the windshield view includes the lane markers 450 and the pedestrian 460. Because the driver can see the pedestrian 460 while the pedestrian 460 crosses from the right side of the road to the left side of the road, the driver may be able to avoid hitting the pedestrian 460 with the vehicle.

As the foregoing examples illustrate, in general, if a road curves, then headlamps that are configured to illuminate the road directly in from of a vehicle unnecessarily limit the distance that the driver of the vehicle can see down the road. By contrast, by moving the headlamps based on the curvature of the road, the distance that the driver can see down the road is increased.

Figure 5:
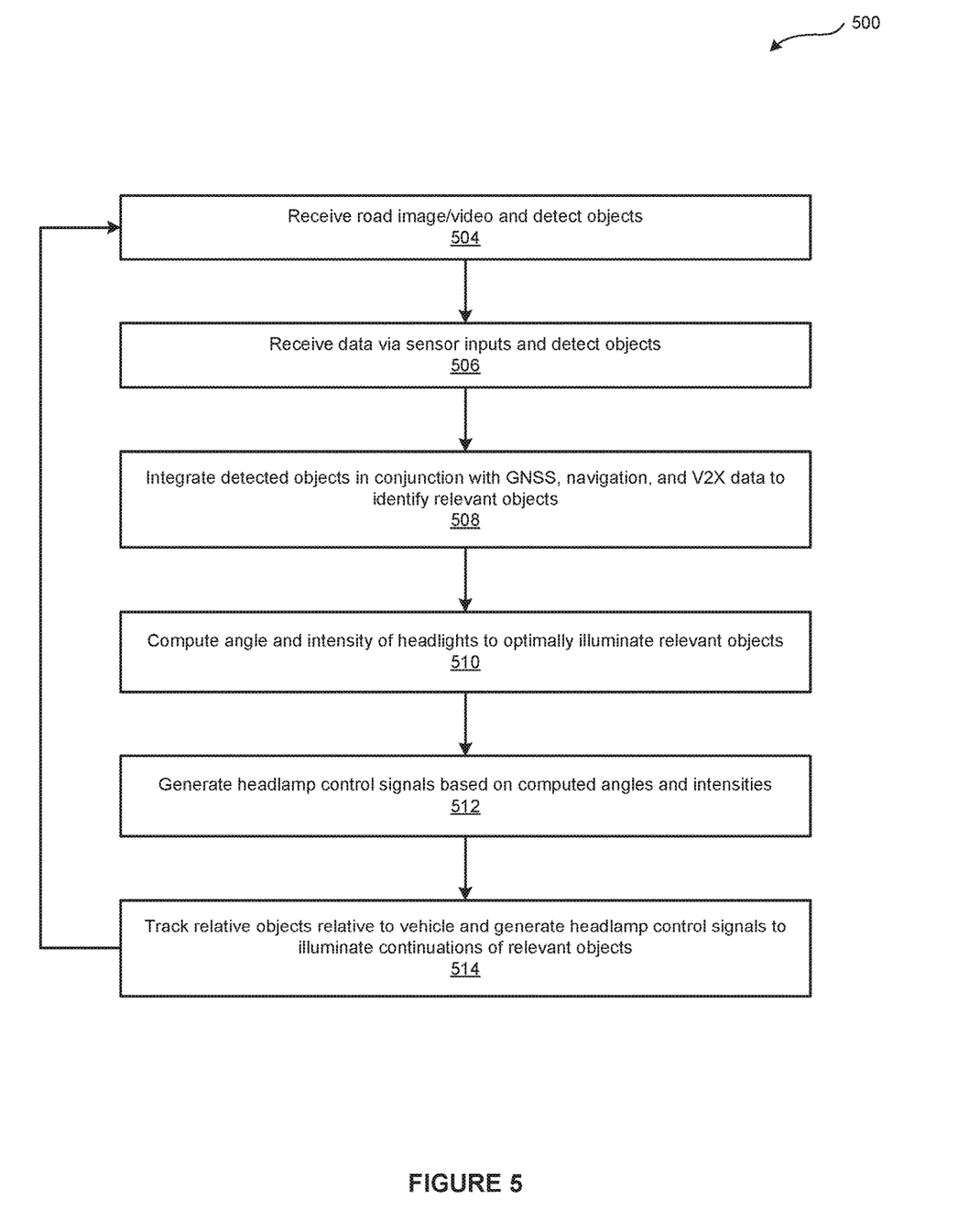
FIG. 5 is a flow diagram of method steps for controlling vehicle headlights, according to various embodiments.

FIG. 5 is a flow diagram of method steps for controlling vehicle headlights, according to various embodiments. Although the method steps are described in conjunction with the systems of FIGS. 1-4, persons skilled in the art will understand that any system configured to implement the method steps, in any order, falls within the scope of the various embodiments.

As shown, a method 500 begins at step 504, where the video/image unit 312 receives road image data from the cameras 232 and performs object detection operations on the image data to generate a first list of objects. At step 506, the sensor data unit 314 receives sensor data from the input sensors 234 and performs object detection operations on the sensor data to generate a second list of objects. At step 508, the integration unit 316 integrates the first list of objects, the second list of objects, and ADAS input data to identify the relevant objects 320. The ADAS input data may include any number and type of data including, without limitation, data received from the GNSS 236, data received from the navigation subsystem 248, and V2X data 238. In general, the integration unit 316 may perform any number of merging, ranking, and/or comparison operations to generate the relevant objects 320.

At step 510, the lighting optimizer 330 receives the relevant objects 320 and computes the optimized lighting characteristics 340 that optimally illuminate the relevant objects 320. The optimized lighting characteristics 340 may include any number of parameters, features, and the like that characterize the vehicle headlights. For example, the optimized lighting characteristics 340 may specify any number and combination of the angle of the vehicle headlights, the intensity of the vehicle headlights, the focus of the vehicle headlights, the color of the vehicle headlights, and so forth.

At step 512, the headlamp control engine 350 computes the headlamp control signals 265 based on the optimized lighting characteristics 340. More specifically, the headlamp control engine 350 configures the headlamps to emit the vehicle headlights as characterized by the optimized lighting characteristics 340. For example, and without limitation, suppose that the optimized lighting characteristics 340 specify that the angle of the vehicle headlights is to be at 45 degrees with respect to the front of the vehicle. The headlamp control engine 350 could transmit headlamp control signals 265 that orient the headlamps to point at 45 degrees with respect to the front of the vehicle.

At step 514, the tracking engine 360 performs tracking operations to predict the location of the continuations of the relevant objects 320. Based on the predicted locations of the continuations of the relevant objects 320, the tracking engine 360 generates additional headlamp control signals 265 that are designed to optimally illuminate the relevant objects 320 as the vehicle and/or the relevant objects 320 move.

The headlight control subsystem 260 continues to cycle through steps 504-514, detecting and illuminating the relevant objects 320 and the continuations of the relevant objects 320 as the vehicle operates. In this fashion, the headlight control subsystem 260 enables the driver to perceive the relevant objects 320 in low light conditions and, consequently, decreases the likelihood of collisions and accidents involving the vehicle that are attributable to the low light conditions.

In one embodiment, a headlight control system optimizes vehicle headlights based on the environment in front of, and in the related front periphery of, a vehicle. In operation, a video/image unit receives image frame data, such as data from visible light cameras, infrared devices, and the like. The video/image unit performs object detection operations to generate lists of detected objects. Similarly, a sensor data unit receives data from input sensors and generates additional lists of detected objects. The input sensors may include any number and combination of RADAR sensors, LIDAR sensors, DSRC sensors, etc. An integration unit integrates and fuses the lists of detected objects in conjunction with advanced driver assistance system (ADAS) data to generate a situational awareness that includes relevant objects. Notably, the ADAS system data may originate from a wide variety of sources including, without limitation, V2X communication, a GNSS receiver, and a navigation subsystem.

A headlight optimizer receives the list of relevant objects and performs lighting calculations to determine the combination of angle, focus, and intensity of vehicle headlights that optimally illuminates the relevant objects. Subsequently, a headlamp control engine generates headlamp control signals that, when received by adjustable headlamps, cause the headlamps to produce the desired vehicle headlights. For example, the headlamp control engine may generate signals that configure pan-tilt assemblies that adjust the angle of the vehicle headlights, variable focusing systems that adjust the focus of the vehicle headlights, and adjustable power sources that tailor the illumination intensity of the vehicle headlights. Subsequently, a tracking engine tracks the relevant objects and adjusts the headlight control signals to continue illuminating the relevant objects as the vehicle and/or the relevant objects move. As the vehicle operates, the headlight control system continues in this fashion—identifying relevant objects, controlling the headlamps to illuminate the relevant objects, tracking the relevant objects, and adjusting the headlamps to continue illuminating the relevant objects.

At least one advantage of the disclosed approach is that the headlight control system strategically illuminates relevant objects in low-light conditions and, consequently, increases driver safety. In particular, because the headlight control system integrates data from a variety of sources to identify and illuminate the objects most relevant to driver safety, the windshield view provides the germane data in a contextually-consistent manner. Consequently, the driver can focus on driving based on the windshield view without being distracted or disoriented by secondary display screens, a mixture of two-dimensional and three-dimensional images, and/or irrelevant data.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by one or more processors, cause the one or more processors to control a vehicle light source by performing the steps of:

detecting, via a first type of sensor, at least one object within a vicinity of a vehicle that includes the vehicle light source;
   predicting at least one future location for each object of the at least one object based on tracking measurements associated with the object;
   determining at least one characteristic for a light beam that is to be generated by the vehicle light source to continually illuminate the at least one object based on a current location and the at least one predicted future location of each object of the at least one object; and
   configuring, based on the at least one characteristic, the vehicle light source to generate a light beam.

2. The one or more computer-readable storage media of claim 1, wherein the vehicle light source comprises a light array or a headlamp.

3. The one or more computer-readable storage media of claim 1, wherein detecting the at least one object comprises determining that image data of the vicinity includes the at least one object.

4. The one or more computer-readable storage media of claim 3, further comprising instructions that, when executed by the processor, cause the processor to receive the image data from a camera that is attached to the vehicle.

5. The one or more computer-readable storage media of claim 1, wherein detecting the at least one object comprises determining that sensor data of the vicinity indicates the presence of the at least one object.

6. The one or more computer-readable storage media of claim 5, wherein the sensor data comprises at least one of radio detection and ranging (RADAR) data, light detection and ranging (LIDAR) data, and dedicated short range communication (DSRC) data.

7. The one or more computer-readable storage media of claim 1, wherein configuring the vehicle light source comprises:
   computing a path for the light beam that originates at the vehicle light source and includes the at least one object; and
   based on the path, computing an angle of the light beam relative to the vehicle light source; and
   orienting the vehicle light source based on the angle.

8. The one or more computer-readable storage media of claim 1, further comprising instructions that, when executed by the processor, cause the processor to determine that the at least one object is relevant to the vehicle by:
   identifying advanced driver assistance system (ADAS) data based on the at least one object; and
   evaluating the ADAS data based on relevance criterion.

9. A system configured to control a vehicle light source, the system comprising:
   a memory storing a headlight control application; and
   a processor coupled to the memory, wherein, when executed by the processor, the headlight control application configures the processor to:
      detect, via a first type of sensor, at least one object within a vicinity of a vehicle that includes the vehicle light source;
      predict at least one future location for each object of the at least one object based on tracking measurements associated with the object;
      generate control signals that configure the vehicle light source to continually illuminate the at least one object based on a current location and the at least one predicted future location of each object of the at least one object; and
      transmit the control signals to the vehicle light source.

10. The system of claim 9, wherein the vehicle light source comprises a light array or a headlamp.

11. The system of claim 9, wherein the headlight control application configures the processor to detect the first set of objects by determining that image data of the vicinity includes the at least one object.

12. The system of claim 11, wherein the headlight control application further configures the processor to receive the image data from a camera that is attached to the vehicle.

13. The computer-readable storage medium of claim 1, wherein the predicting at least one future location for each object of the at least one object comprises performing one or more filtering operations on one or more measurements associated with the object to estimate the predicted at least one future location.

14. The computer-readable storage medium of claim 1, wherein the at least one characteristic includes at least one of:
   an angle of the light beam; and
   an intensity of the light beam.

15. The computer-readable storage medium of claim 1, wherein the at least one characteristic includes at least one of:
   a focus of the light beam; and
   a color of the light beam.

16. The computer-readable storage medium of claim 1, further including instructions that, when executed by the processor, cause the processor to determine the relevance of objects included in the list of at least one object based on advanced driver assistance system (ADAS) data comprising at least one of Global Navigation Satellite System (GNSS) data, data received from a navigation subsystem, and vehicle-to-everything (V2X) data.

17. The computer-readable storage medium of claim 1, wherein generating the at least one characteristic comprises determining a first color of light for a first object type included in the at least one object, and determining a second color of light for a second object type included in the list of at least one object.

18. The computer-readable storage medium of claim 1, wherein the first type of sensor is one of a visible light camera, an infrared camera, a radio detection and ranging (RADAR) sensor, a light detection and ranging (LIDAR) sensor, and a dedicated short range communication (DSRC) sensor.

19. The computer-readable storage medium of claim 1, further comprising instructions that, when executed by the processor, cause the processor to:
   detect, via a second type of sensor, at least one object within the vicinity of the vehicle; and
   integrate the objects detected via the first type of sensor and the second type of sensor.

* * * * *